(No Model.) 2 Sheets—Sheet 1.
H. M. ASHLEY.
MACHINERY FOR MAKING GLASS BOTTLES, &c.
No. 403,716. Patented May 21 1889.
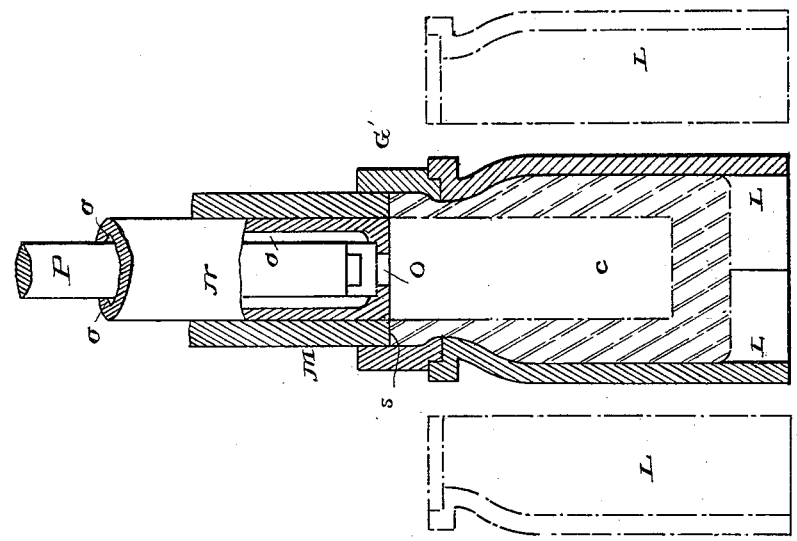
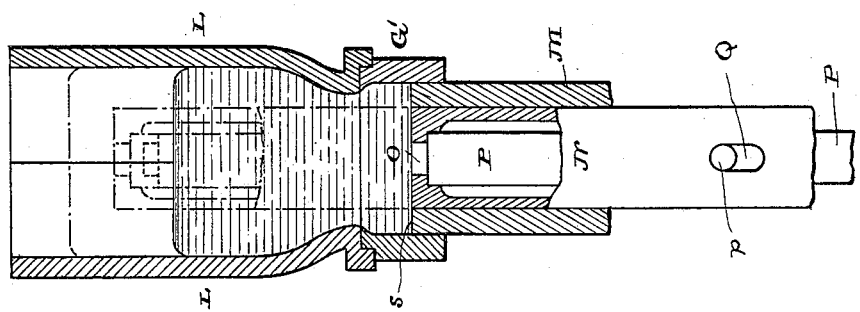
Witnesses
Inventor
HOWARD MATRAVERS ASHLEY
By his Attorney
Francis Forbes (No Model.) 2 Sheets—Sheet 2.

H. M. ASHLEY.
MACHINERY FOR MAKING GLASS BOTTLES, &c.

No. 403,716. Patented May 21 1889.

Witnesses,
_____
Lost Phillips.

Inventor.
HOWARD MATRAVERS ASHLEY
By his Attorney Francis Forbes

UNITED STATES PATENT OFFICE.

HOWARD MATRAVERS ASHLEY, OF FERRYBRIDGE, COUNTY OF YORK, ENGLAND.

MACHINERY FOR MAKING GLASS BOTTLES, &c.

SPECIFICATION forming part of Letters Patent No. 403,716, dated May 21, 1889.

Original application filed September 26, 1887. Serial No. 250,767. Divided and this application filed November 10, 1888. Serial No. 290,505. (No model.) Patented in England November 13, 1886, No. 14,727; in Austria-Hungary September 19, 1887; in Belgium September 23, 1887; in France September 24, 1887; in Canada January 3, 1888, No. 28,296; in Italy February 17, 1888; in Norway March 2, 1888; in Victoria April 18, 1888; in New South Wales April 20, 1888; in Tasmania April 21, 1888; in Spain July 13, 1888, and in Portugal August 3, 1888.

*To all whom it may concern:*

Be it known that I, HOWARD MATRAVERS ASHLEY, a subject of the Queen of Great Britain and Ireland, and a resident of Ferrybridge, in the county of York, England, have invented a new and useful Improvement in Machinery for the Manufacture of Bottles and other Like Hollow Glassware, (patented to me in Great Britain and Ireland by Letters Patent No. 14,727, dated November 13, 1886; in Austria-Hungary by Letters Patent dated September 19, 1887; in Belgium by Letters Patent dated September 23, 1887; in France by Letters Patent dated September 24, 1887; in Canada by Letters Patent No. 28,296, dated January 3, 1888; in Italy by Letters Patent dated February 17, 1888; in Victoria by Letters Patent dated April 18, 1888; in New South Wales by Letters Patent dated April 20 1888; in Tasmania by Letters Patent dated April 21, 1888; in Norway by Letters Patent dated March 2, 1888; in Spain by Letters Patent dated July 13, 1888, and in Portugal by Letters Patent dated August 3, 1888,) of which the following is a specification.

This invention relates to means for making bottles and like hollow glassware by machinery, so as to dispense with the harmful process of blowing by mouth, and also to reduce the cost of manufacture.

In another specification forming part of an application for United States Letters Patent filed September 26, 1887, Serial No. 250,767, of which this is a division, I have described and claimed a certain vacuum or exhaust process for effecting the above-named object.

The present invention consists in peculiar apparatus for carrying the same into effect, comprising certain novel combinations of parts, hereinafter set forth and claimed.

Two sheets of drawings accompany this specification as part thereof.

Figure 4:
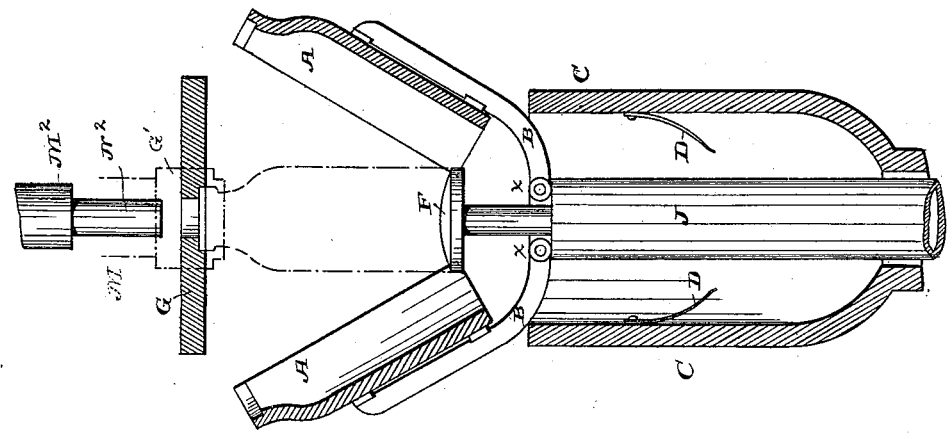
Figure 3:
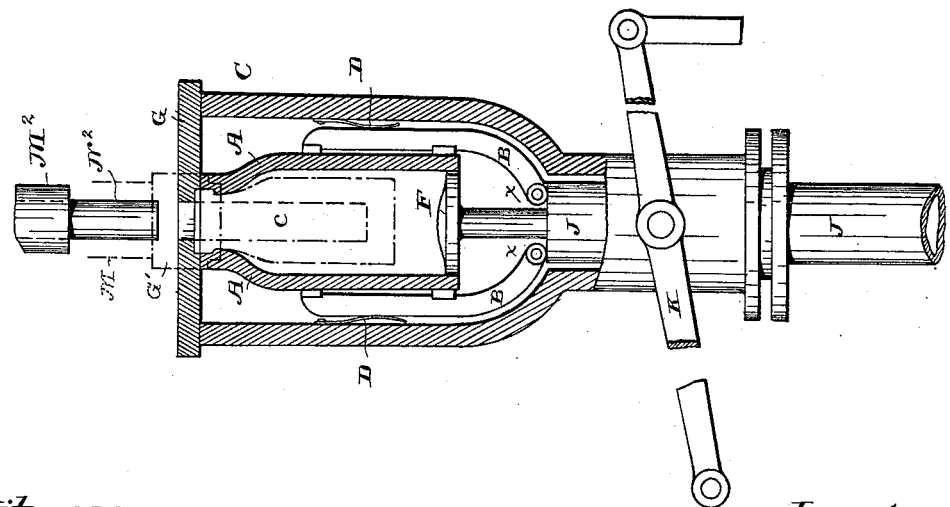

Figures 1 and 2 of the drawings represent sectional elevations of a "parison-mold," illustrating by full and dotted lines four positions of its parts. Fig. 3 is a sectional elevation of a bottle-mold and exhauster, showing the same closed and ready for the exhausting operation. Fig. 4 is a like view of the same, showing the bottle finished and the mold and exhauster opened.

Like letters of reference indicate corresponding parts in the several figures.

For clearness I have confined the drawings and will confine the following description to molds for making bottles, and have omitted in the drawings details of frame-work and actuating devices which form no part of this invention and will be readily supplied by machinists without further direction.

The first part of my aforesaid process, as illustrated by Fig. 1, consists in measuring the molten glass, casting a "parison" in inverted position with a head that is finished as to external shape, and forming an initial recess or cavity therein by punching upward into the parison while it is inverted and the molten glass is unconfined, in contradistinction to forming the head of the bottle by pressing or by spinning operations. This is preferably effected in a parison-mold, Figs. 1 and 2, having a longitudinally-divided hollow body or mold proper, L, which is removable from the punched parison by separating its parts after the mold is inverted, as illustrated by Fig. 2, the parison to be expanded by the direct pressure of a gaseous fluid, as air, to form the body of the bottle within a distinct shaping-mold. In the said parison-mold, Figs. 1 and 2, the parts of the body-mold L coact with a head-mold or collar, G', upon a tube, M, through which a hollow punch, N, works. This punch is made with a suitable opening, O, in its "face," which enters the mold, and an internal plug, P, is in the example fitted thereto. The stem of this plug extends longitudinally through the outer end of the punch and serves as a means by which to force the punch forward into the glass within the mold to form the initial cavity c, and then to retract the punch. This movement is controlled by a stud-pin, p, working in a slot, Q, in the punch N, and passages o in the punch connect the opening O with the interior of the tube M. When the required quantity of molten glass is run into the inverted mold, thereby casting a parison in inverted position, the punch N is forced upward into the same, its outlet-opening O being kept closed by the plug P, and on being retracted the first movement of the plug admits a gaseous fluid, as air, through the outlet-opening O into the cavity $c$, from which the punch is being withdrawn, so as to prevent a vacuum in the glass. The plug is shown at the end of its opening movement in dotted lines in Fig. 1.

In the act of casting the parison the head of the bottle is finished as to external shape without the aid of any pressing or spinning operation by means of a suitably-recessed head-mold or collar, G' or G, and an annular surface, $s$, which is conveniently formed on the end of the tube M within the inner circumference of the collar. This surface shapes the outer face of the lip, and is readily given any required form by lathe-turning or cutting.

When the diameter of the neck of a bottle is to exceed the diameter of the head, a collar, G, may be used made in one part; but for otherwise molding the head, as indicated in Figs. 1 and 2, a divided collar, such as G', is required, and such divided collar preferably embraces a suitable nozzle, which is formed, for example, by the end of said tube M and provided with said surface $s$.

The parts of the body-mold L and those of the divided collar G' may be carried into and out of position by any approved means. Suitable slides for the purpose are shown at U and at H H$^2$, Figs. 6 to 10 in the drawings forming part of another companion case, Serial No. 290,508, filed November 10, 1888.

The diameter of the punch N is made suitable for the mouth of the bottle, and the glass cut out by the punch is carried bodily forward and left in the hotter part of the mass, where it soon recovers from the chilling contact of the punch and head-mold, while the mouth itself is sufficiently chilled to cause it to preserve the diameter so given to it. Bottles thus made are perfectly uniform as to size of mouth and shape of head or lip, which is frequently a great desideratum.

When the parison is completed, the parison-mold is reversed and its body-mold L is then opened, as illustrated by Fig. 2. The parison suspended by the collar G' or G is now inclosed, for example, in the bottle-mold and exhauster represented by Figs. 3 and 4, which is the particular subject-matter of the present specification.

The parison is shown in position within the bottle-mold in dotted lines in Fig. 3. This mold comprises a suitably-divided body-mold, A. In the example this mold is made in longitudinal halves, which are carried by laterally-swinging arms B, to which they are suitably attached. A suitable bottom, F, at its large end completes the mold, which is internally of the finished shape of the neck, body, and bottom of the bottle. The neck end of the mold is closed by the head of the parison and the collar G' or G encircling the same. The divided collar G', together with said tube M, is shown in connection with the bottle-mold by dotted lines in Figs. 3 and 4, illustrating the preferred retention of their union until the bottle is finished. The collar may instead be employed in connection with any suitable parison-punch, as N$^2$, working in any suitable guide, as M$^2$, the collar being separated from the punch for the molding operation, as illustrated, by the collar G. (Shown in full lines in Figs. 3 and 4.)

For the purposes of this invention a marginally-extended true-plate must in all cases be formed on or combined with the collar, as illustrated by said collar G. The upper edge of an inverted vacuum-bell or exhaust-chamber, C, closes upward against said true-plate, and the parts of the closed body-mold A are pressed together by springs D within the bell acting on the backs of said arms B. The arms B swing open and closed on pivots $x$ at their lower ends. Their opening movement is permitted by lowering the bell C, which carries the springs D out of contact with the arms. The body-mold A, arms B, and bell C are shown in their open positions in Fig. 4.

The bell C is connected with an air-pump or other exhausting apparatus, and is arranged to be moved up and down the exhaust-pipe J by means of a lever, K, or by other equivalent means. When the top edge of the bell C is so moved up to the face of the true-plate, the apparatus is closed and is sufficiently air-tight, and in rising to this position it brings the springs D into contact with the backs of the arms B, so as to close the mold A, after which they continue to press its parts together. The bell C being closed against the true-plate, the air is exhausted through the pipe J, and a vacuum or partial vacuum is formed in the bell C, and also around the suspended parison in the mold A, which communicates with the bell. The pressure of the atmosphere within the cavity of the parison expands the molten glass until it fills every part of the mold, pressing upon the walls of its interior and against the bottom F at all points and forming a perfectly-shaped bottle. When the bell C is lowered, the arms B and mold A fall open. The bottom F is then lowered, and the collar G' or G is opened, either or both, as may be required, permitting the released bottle to be taken out and passed to the annealing-oven.

In order that the molten glass when required for use may be of equal temperature throughout, I preferably scoop up a sufficient quantity of glass from the tank with a crucible or like vessel of plumbago or other material that is a slow conductor of heat, and which has been previously heated to the temperature of the glass, so as to prevent chilling the same. After the externally-adhering glass has drained back into the tank the vessel is taken from the furnace and the molten glass is poured therefrom into the molds, as required. While the vessel is so draining the glass within it recovers from any disturbance or variation of its temperature and fluidity due to removing it from the tank, and uniformity of thickness in the molded article is thus insured.

At any part of the mold where the glass would be likely to cool too rapidly from any cause I arrange that the flames from one or more gas-burners shall impinge upon such part, so as to retain it at the required temperature.

Details of construction and procedure which have not been specified may be of any approved description.

I do not claim herein the above-mentioned parison-mold, Figs. 1 and 2, nor the above-mentioned processes of making parisons and expanding them by the direct pressure of a gaseous fluid, as air, nor any of the steps thereof, nor the above-described process of handling the molten glass preparatory to the parison-casting operation. These inventions are claimed in said original application and other divisions thereof, serially numbered 290,506, 290,507, and 290,510, filed November 10, 1888. Neither do I limit my claims, hereinafter stated, to bottle-molds to which the drawings and description have been confined for greater clearness, as aforesaid, nor to details of construction not essential to the respective combinations of parts.

Having thus described said improvement in machinery, as a whole, I claim as my invention, and desire to patent under this specification—

1. In machinery for the manufacture of bottles and other like hollow glassware, the combination, with a suitable mold, of an exhausting apparatus comprising a bell which incloses or partly incloses such mold, substantially as hereinbefore specified.

2. In machinery for the manufacture of bottles and other like hollow glassware, the combination, with a suitable mold, of a combined head-mold and true-plate fitted to one end thereof and provided with an aperture in communication with the interior of the mold, which suspends a hollow parison within the mold, and an exhausting apparatus comprising a bell which incloses or partly incloses the mold for expanding the glass within the latter, substantially as hereinbefore specified.

3. In machinery for the manufacture of bottles and other like hollow glassware, the combination of a longitudinally-divided mold, laterally-swinging arms which carry the respective mold parts, and springs which press together the mold parts, substantially as hereinbefore specified.

4. In machinery for the manufacture of bottles and other like hollow glassware, the combination of a longitudinally-divided mold, swinging arms carrying the mold parts, and an endwise-sliding bell provided internally with springs and which incloses or partly incloses the mold and by said springs presses its parts together, substantially as hereinbefore specified.

HOWARD MATRAVERS ASHLEY.

Witnesses:
FRANCIS FORBES,
JAS. L. EWIN.